United States Patent
Huang et al.

(10) Patent No.: US 10,664,580 B2
(45) Date of Patent: May 26, 2020

(54) SIGN-IN SYSTEM, METHOD, APPARATUS AND SERVER BASED ON FACIAL RECOGNITION

(71) Applicant: TENCENT TECHNOLOGY (SHENZHEN) COMPANY LIMITED, Shenzhen (CN)

(72) Inventors: Feiyue Huang, Shenzhen (CN); Yongjian Wu, Shenzhen (CN); Guofu Tan, Shenzhen (CN); Jilin Li, Shenzhen (CN); Zhibo Chen, Shenzhen (CN); Xiaoqing Liang, Shenzhen (CN); Zhiwei Tao, Shenzhen (CN); Kejing Zhou, Shenzhen (CN); Ke Mei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/100,630

(22) Filed: Aug. 10, 2018

(65) Prior Publication Data
US 2018/0349590 A1 Dec. 6, 2018

Related U.S. Application Data

(63) Continuation of application No. PCT/CN2017/074143, filed on Feb. 20, 2017.

(30) Foreign Application Priority Data

Mar. 4, 2016 (CN) .......................... 2016 1 0124812

(51) Int. Cl.
*G06F 21/00* (2013.01)
*G06F 21/32* (2013.01)
(Continued)

(52) U.S. Cl.
CPC ......... *G06F 21/32* (2013.01); *G06K 9/00228* (2013.01); *G06K 9/00268* (2013.01);
(Continued)

(58) Field of Classification Search
None
See application file for complete search history.

(56) References Cited

U.S. PATENT DOCUMENTS

| | | | |
|---|---|---|---|
| 6,985,070 B1* | 1/2006 | Parker | G07C 9/38 340/5.33 |
| 2009/0220155 A1* | 9/2009 | Yamamoto | G06K 9/00221 382/190 |

(Continued)

FOREIGN PATENT DOCUMENTS

| | | |
|---|---|---|
| CN | 102419819 A | 4/2012 |
| CN | 103914676 A | 7/2014 |

(Continued)

OTHER PUBLICATIONS

The State Intellectual Property Office of the People's Republic of China (SIPO) Office Action 1 for 201610124812.6 dated May 31, 2019 7 Pages (including translation).
(Continued)

*Primary Examiner* — Andrew J Steinle
(74) *Attorney, Agent, or Firm* — Anova Law Group, PLLC

(57) ABSTRACT

A sign-in method and server based on facial recognition are provided. The method includes: receiving a face image of a sign-in user from a sign-in terminal. According to the face image of the sign-in user, whether a target registration user matching the sign-in user exists in a pre-stored registration set is detected. The registration set includes a face image of at least one registration user. Further, the target registration
(Continued)

user is confirmed as signed in successfully if the target registration user exists in the registration set.

20 Claims, 5 Drawing Sheets

(51) Int. Cl.
    *G06K 9/00*     (2006.01)
    *G06K 9/62*     (2006.01)

(52) U.S. Cl.
    CPC ..... *G06K 9/00281* (2013.01); *G06K 9/00288* (2013.01); *G06K 9/6274* (2013.01); *G06K 9/00* (2013.01)

(56) References Cited

U.S. PATENT DOCUMENTS

2013/0219480 A1*   8/2013   Bud ........................ G06F 21/32
                                                                                 726/7

2014/0075528 A1*   3/2014   Matsuoka ............... G06F 21/32
                                                                                 726/7

FOREIGN PATENT DOCUMENTS

| CN | 104091176 A | 10/2014 |
|---|---|---|
| CN | 104183029 A | 12/2014 |
| CN | 104463172 A | 3/2015 |
| CN | 105139470 A | 12/2015 |
| CN | 105469455 A | 4/2016 |
| CN | 105809415 A | 7/2016 |

OTHER PUBLICATIONS

The World Intellectual Property Organization (WIPO) International Search Report for PCT/CN2017/074143 dated Apr. 25, 2017 5 Pages (including translation).

The State Intellectual Property Office of the People's Republic of China (SIPO) Office Action 3 for 201610124812.6 dated Sep. 5, 2019 8 Pages (including translation).

* cited by examiner

SIGN-IN SYSTEM, METHOD, APPARATUS AND SERVER BASED ON FACIAL RECOGNITION

RELATED APPLICATION

This application is a continuation application of PCT Patent Application No. PCT/CN2017/074143, filed on Feb. 20, 2017, which claims priority to China Patent Application No. 201610124812.6, filed with the Chinese Patent Office on Mar. 4, 2016 and entitled "SIGN-IN SYSTEM, METHOD AND APPARATUS BASED ON FACIAL RECOGNITION", the entire contents of all of which are incorporated herein by reference.

FIELD OF THE TECHNOLOGY

Embodiments of the present disclosure relate to the field of electronic sign-in technologies, and in particular, to a sign-in system, method, apparatus and server based on facial recognition.

BACKGROUND OF THE DISCLOSURE

With the application and popularization of various types of electronic products, electronic sign-in has been widely applied to fields such as conference sign-in, office sign-in for staff, class sign-in for students.

Common electronic sign-in methods include: sign-in at a channel, sign-in by swiping a card, and sign-in with a graphic code. Principles of the foregoing electronic sign-in methods are substantially the same: a recognizable object for identifying the identity of a user is fabricated for the user in advance, and the identity of the user can be verified based on the recognizable object during a sign-in process, thus completing sign-in.

However, the existing technology above has at least the following technical problem: another person may sign in fraudulently, because with only a recognizable object, it is impossible to confirm the identity of a person who actually signs in.

SUMMARY

To resolve the problem in the electronic sign-in method in the existing technology that another person may sign in fraudulently, because with only a recognizable object, it is impossible to confirm the identity of a person who actually signs in, embodiments of the present disclosure provide a sign-in system, method, apparatus, and server based on facial recognition. The technical solutions are as follows:

One aspect of the present disclosure provides a sign-in method based on facial recognition. The method includes: receiving a face image of a sign-in user from a sign-in terminal. According to the face image of the sign-in user, whether a target registration user matching the sign-in user exists in a pre-stored registration set is detected. The registration set includes a face image of at least one registration user. The target registration user are confirmed as signed in successfully if the target registration user exists in the registration set.

Another aspect of the present disclosure provides a server for sign-in based on facial recognition. The server includes one or more processors and a memory. The one or more processors are configured to perform: receiving a face image of a sign-in user from a sign-in terminal; and detecting, according to the face image of the sign-in user, whether a target registration user matching the sign-in user exists in a pre-stored registration set. The registration set includes a face image of at least one registration user. The server further confirms that the target registration user signs in successfully if the target registration user exists in the registration set.

Another aspect of the present disclosure provides a non-transitory computer-readable storage medium that stores computer program instructions. The computer program instructions are executable by at least one processor to perform: receiving a face image of a sign-in user from a sign-in terminal; and detecting, according to the face image of the sign-in user, whether a target registration user matching the sign-in user exists in a pre-stored registration set. The registration set includes a face image of at least one registration user. The target registration user is confirmed as signed in successfully if the target registration user exists in the registration set.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings.

Figure 1:
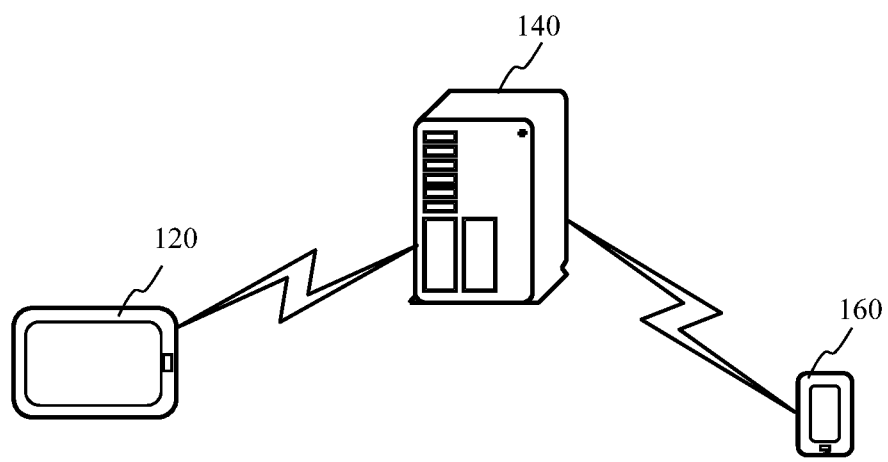
FIG. 1 is a schematic diagram of an implementation environment according to an embodiment of the present disclosure.

Refer to FIG. 1, which is a schematic diagram of an implementation environment according to an embodiment of the present disclosure. The implementation environment includes: a sign-in terminal 120 and a server 140.

The sign-in terminal 120 is an electronic device having computing, storage, and image acquisition functions. A sign-in client may be installed and run in the sign-in terminal 120. The sign-in client is configured to implement various functions of the sign-in terminal in the following embodiments.

A communication connection may be established between the sign-in terminal 120 and the server 140 by using a wireless network or a wired network.

The server 140 may be one server, or a server cluster including multiple servers, or a cloud computing service center.

Optionally, as shown in FIG. 1, the implementation environment further includes: a user terminal 160.

The user terminal 160 may be an electronic device such as a mobile phone, a tablet computer, or a personal computer (PC). A communication connection may be established between the user terminal 160 and the server 140 by using a wireless network or a wired network.

Figure 2A:
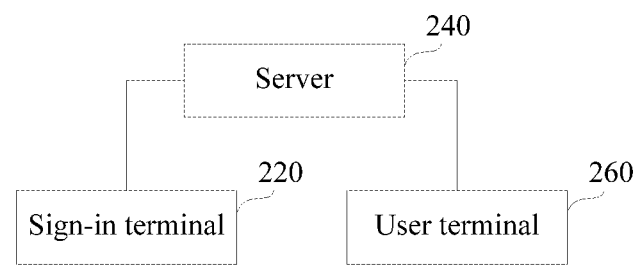
FIG. 2A is a block diagram of a sign-in system based on facial recognition according to an embodiment of the present disclosure.

Refer to FIG. 2A, which is a block diagram of a sign-in system based on facial recognition according to an embodiment of the present disclosure. The sign-in system includes: a sign-in terminal 220, a server 240, and a user terminal 260.

The sign-in terminal 220 is configured to acquire a face image of a sign-in user, and send the face image of the sign-in user to the server 240.

The sign-in terminal 220 is configured with a camera. The face image of the sign-in user is collected by the camera. During sign-in on site, the sign-in user faces the camera of the sign-in terminal 220, so that sign-in terminal 220 acquires the face image of the user. The sign-in user refers to a user who actually signs in on a sign-in site.

The server 240 is configured to receive the face image of the sign-in user from the sign-in terminal 220; detect, according to the face image of the sign-in user, whether a target registration user matching the sign-in user exists in a pre-stored registration set; and confirm that the target registration user signs in successfully if the target registration user exists in the registration set.

The registration set pre-stored in the server 240 includes a face image of at least one registration user. The registration user refers to a pre-registered user that needs to sign in. The server 240 can obtain the face image of the registration user in the following two manners.

In the first possible implementation, the server 240 is configured to display a registration user entry interface, to obtain the face image of the registration user entered to the registration user entry interface. Using conference sign-in as an example, an administrator may create a conference in the server 240, and set conference information such as name, time, and address of the conference. After the conference is created, the administrator may enter face images of registration users (namely, conference participants) in the registration user entry interface provided by the server 240. The server 240 correspondingly stores the face image and an identifier of each registration user into the registration set. In addition, in an actual application, considering that the administrator may be unable to obtain face images of all or some registration users in advance, this embodiment further provides the following second possible implementation.

In the second possible implementation, the server 240 is configured to receive the face image of the registration user from the user terminal 260, and store the face image of the registration user into the registration set. The administrator may send registration prompt information carrying a registration link to the user terminal 260 corresponding to the registration user in advance. The registration prompt information is used for guiding the user to log on to a registration page corresponding to the registration link, and submit the face image to the registration page, to complete registration.

Figure 2B:
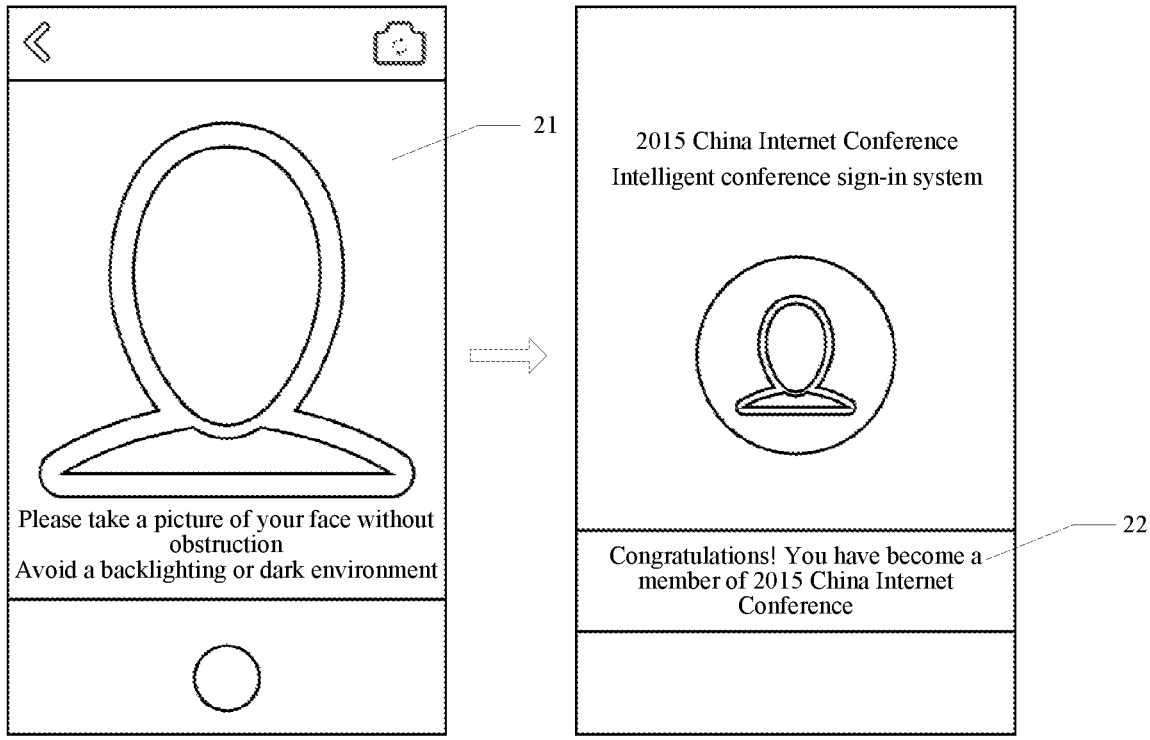
FIG. 2B is a schematic diagram of an interface of a registration process in the embodiment shown in FIG. 2A.

Correspondingly, the user terminal 260 is configured to obtain the registration link corresponding to the registration page, open the registration page according to the registration link, obtain the face image of the registration user submitted to the registration page, and send the face image of the registration user to the server 240. For example, the administrator may send an SMS message to the user terminal 260 corresponding to the registration user by means of the server 240, where the SMS message includes the registration link. After opening the registration link, the registration user may be verified based on a phone number and log on to the registration page. Then, the registration user can shoot a face image or select a face image from an album and submit the face image to the registration page. Refer to FIG. 2B, which is a schematic diagram of an interface of a registration process. After the registration user shoots a face image 21 thereof, the user terminal 260 sends the face image 21 to the server 240. After verification, the server 240 feeds back, to the user terminal 260, prompt information 22 indicating that registration is successful. The user terminal 260 displays the prompt information 22 indicating that registration is successful.

In addition, the server 240 is specifically configured to: extract an image feature from the face image of the registration user by using a facial recognition algorithm, and correspondingly store the identifier of each registration user and the image feature of the face image into the registration set correspondingly. For a specific algorithm process of the facial recognition algorithm, refer to the introduction and illustration below.

Optionally, the server 240 is further configured to determine whether the face image of the registration user meets a registration condition; store the face image of the registration user into the registration set if the face image of the registration user meets the registration condition; and send out a registration failure prompt or send a registration failure response to the user terminal 260 if the face image of the registration user does not meet the registration condition.

Corresponding to the foregoing first possible implementation, the server 240 sends out a registration failure prompt when determining that the face image of the registration user does not meet the registration condition. The registration failure prompt is used for reminding the administrator that the previously entered face image of the registration user is invalid. The administrator selects a new face image of the registration user according to the registration failure prompt. The new face image is entered to the registration user entry interface, so as to be submitted to the server 240.

Corresponding to the foregoing second possible implementation, the server 240 sends a registration failure response to the user terminal 260 when determining that the face image of the registration user does not meet the registration condition. Correspondingly, the user terminal 260 is further configured to send out (e.g., present) prompt information after receiving the registration failure response, the prompt information being used for indicating that the face image of the registration user is invalid. The registration user shoots or selects a new face image according to the prompt information, and submits the new face image to the registration page.

The registration condition includes at least one of a light condition of the face image of the registration user meeting a first predetermined condition or a face pose of the face image of the registration user meeting a second predetermined condition.

When the registration condition includes that a light condition of the face image of the registration user meets a first predetermined condition, the server 240 is specifically configured to: extract a face region from the face image of the registration user; calculate a light score corresponding to the face region; determine whether the light score is greater than a predetermined score; determine that the light condition of the face image of the registration user meets the first predetermined condition if the light score is greater than the preset score; and determine that the light condition of the face image of the registration user does not meet the first predetermined condition if the light score is less than the preset score. The value of the preset score is set according to an actual requirement on the light condition of the image. If the requirement on the light condition of the image is relatively high, the preset score is set to a relatively large value. If the requirement on the light condition of the image is relatively low, the preset score is set to a relatively small value. The light score includes at least one of the following calculation parameters: 1. a difference S1 between a histogram of the left half of the face region and a histogram of the right half of the face region; 2. a difference S2 between an average luminance of the left half of the face region and an average luminance of the right half of the face region; 3. a difference S3 between an average luminance of the whole face region and a standard luminance value, the standard luminance value being an empirical value set in advance according to an actual requirement, for example, 0.55; and 4. a variance S4 of different partitions in the face region. When calculating the light score corresponding to the face region, the server 240 normalizes the calculation parameters into a range of [0, 1], and calculates the light score by using a weighted summation formula. For example, if the foregoing four calculation parameters are all included, the light score corresponding to the face region is calculated as follows: $s=w1 \times s1+w2 \times s2+w3 \times s3+w4 \times s4$, where s1, s2, s3, and s4 represent normalized results of S1, S2, S3, and S4 respectively. Values of the weights may be set in advance according to an actual requirement, for example, {w1, w2, w3, w4}={0.15, 0.1, 0.3, 0.45}.

When the registration condition includes that a face pose of the face image of the registration user meets a second predetermined condition, the server 240 is specifically configured to: extract a face region from the face image of the registration user; calculate an inclination angle (tilt angle) of the face region; determine whether the inclination angle of the face region belongs to a predetermined value range; determine that the face pose of the face image of the registration user meets the second predetermined condition if the inclination angle belongs to the predetermined value range; and determine that the face pose of the face image of the registration user does not meet the second predetermined condition if the inclination angle does not belong to the predetermined value range. The inclination angle of the face region may be calculated by using a related existing algorithm, which is not limited in this embodiment. For example, the inclination angle may be an angle between a midline of a face in the face image and a vertical line of the face image.

In addition, during matching with a target registration user, the server 240 is specifically configured to: extract an image feature from the face image of the sign-in user by using a facial recognition algorithm having a recognition accuracy degree greater than a first threshold; separately calculate a similarity degree between the face image of the sign-in user and the face image of each registration user according to the image feature of the face image of the sign-in user and an image feature of the face image of each registration user; detect whether a maximum similarity degree is greater than a second threshold; confirm that a registration user corresponding to the maximum similarity degree is the target registration user matching the sign-in user, if the maximum similarity degree is greater than the second threshold; and confirm that the sign-in user fails in sign-in if the maximum similarity degree is less than the second threshold. A joint Bayesian algorithm may be used as an algorithm for the similarity degree. The value of the second threshold is set according to a requirement on precision of facial matching. If the requirement on precision of facial matching is relatively high, the second threshold is set to a relatively large value. If the requirement on precision of facial matching is relatively low, the second threshold is set to a relatively small value. The facial recognition algorithm having a recognition accuracy degree greater than a first threshold refers to a facial recognition algorithm of which the recognition accuracy degree reaches a preset accuracy requirement. In this embodiment of the present disclosure, a facial recognition algorithm with a high recognition accuracy degree is used to extract the image feature of the face image, to ensure accurate matching between the sign-in user and the registration user, so that it can be directly confirmed that the target registration user signs in successfully when the target registration user matching the sign-in user exists in the registration set. The user does not need to further confirm manually whether the target registration user obtained through matching is the user himself/ herself, thus reducing user operations, simplifying a sign-in process, and improving sign-in efficiency.

The server 240 is specifically configured to: perform feature point positioning on the face image of the sign-in user, to obtain a feature point positioning result; divide the face image of the sign-in user into multiple face regions according to the feature point positioning result; extract a feature from each face region by using a deep network corresponding to the face region to obtain multiple features corresponding to the multiple face regions; and recombine the multiple features extracted from the face regions, to obtain the image feature of the face image of the sign-in user. Feature points in the face image refer to center of the eyes, tip of the nose, corners of the mouth, and so on in the face. The feature point positioning result may be represented by using a feature point vector that includes coordinates of each feature point. For different face regions, corresponding deep networks are separately trained in advance. The deep networks are used for extracting image features from the face regions, and Convolutional Neural Networks (CNNs) may be used as the deep networks. In this embodiment of the present disclosure, the image feature of the face image is obtained by using a deep learning-based facial recognition algorithm, achieving a higher recognition accuracy degree compared with other facial recognition algorithms. In addition, respective deep networks corresponding to different face regions (such as an eye region, a nose region, and a mouth region) are trained separately, and features are extracted by using the respective deep networks, to fully ensure the accuracy of feature extraction.

After confirming that the target registration user signs in successfully, the server 240 may further be configured to mark the target registration user as signed in. Further, the server 240 is further configured to collect statistics about registration users marked as signed in and/or registration users that have not signed in, and present the statistical result. For example, the server 240 may present the statistical result such as all registration users that have signed in, all registration users that have not signed in, and the quantity or ratio of the registration users that have signed in. For example, the registration set is corresponded to a particular current conference. The statistics are collected based on a participant list of the registration set corresponding the current conference.

It should be additionally noted that, similar to determining whether the face image of the registration user meets the registration condition, after receiving the face image of the sign-in user from the sign-in terminal 220, the server 240 is further configured to: determine whether the face image of the sign-in user meets a sign-in condition; detect, according to the face image of the sign-in user, whether a target registration user matching the sign-in user exists in the pre-stored registration set if the face image of the sign-in user meets the sign-in condition; and send an image retransmission instruction to the sign-in terminal 220 if the face image of the sign-in user does not meet the sign-in condition. The sign-in terminal 220 is further configured to send out adjustment prompt information after receiving the image retransmission instruction from the server 240, and acquire and send a new face image of the sign-in user. The adjustment prompt information is used for prompting the user to adjust a light condition and/or face pose. The sign-in condition includes that a light condition of the face image of the sign-in user meets a first predetermined condition and/or a face pose of the face image of the sign-in user meets a second predetermined condition. A specific manner of determining whether the sign-in condition is met is the same as or similar to the manner of determining whether the registration condition is met. For details, refer to the introduction and illustration above. Details are not described herein again.

In conclusion, according to the system provided in this embodiment, a server receives a face image of a sign-in user from a sign-in terminal; detects, according to the face image of the sign-in user, whether a target registration user matching the sign-in user exists in a pre-stored registration set; and confirms that the target registration user signs in successfully if the target registration user exists in the registration set. The system resolves the problem in the electronic sign-in method in the existing technology that another person may sign in fraudulently, because with only a recognizable object, it is impossible to confirm the identity of a person who actually signs in. In this embodiment, facial scan sign-in is carried out based on facial recognition, so that the identity of a user who actually signs in is confirmed and verified, to avoid fraudulent sign-in by another person.

In addition, according to the system provided in this embodiment, an image feature of the face image is further extracted by using a facial recognition algorithm having a high recognition accuracy degree, to ensure accurate matching between the sign-in user and the registration user, so that it can be directly confirmed that the target registration user signs in successfully when the target registration user matching the sign-in user exists in the registration set. The user does not need to further confirm manually whether the target registration user obtained through matching is the user himself/herself, thus reducing user operations, simplifying a sign-in process, and improving sign-in efficiency.

In addition, according to the system provided in this embodiment, it is further determined whether the face image of the registration user meets a registration condition and/or whether the face image of the sign-in user meets a sign-in condition, to ensure that an image with a good light condition and a neutral face pose is obtained, avoiding impact of factors such as lighting and pose on the facial recognition result and improving accuracy of facial recognition and matching. For example, the technical solution provided in this embodiment of the present disclosure can obtain a face image under an indoor light condition, the face pose in the face image being allowed to turn left and right or up and down within 30 degrees, to ensure a good facial recognition and matching result.

In addition, according to the system provided in this embodiment, the server further provides a remote registration page to the user terminal, so that the registration user registers and submits the face image thereof, avoiding the problem that the registration fails because an administrator cannot acquire the face image of the registration user in advance.

In addition, the system provided in this embodiment is applicable to any sign-in scenario such as conference sign-in, office sign-in for staff, and class sign-in for students. The face scan sign-in solution provided in this embodiment of the present disclosure does not require a user to further confirm manually whether the target registration user obtained through matching is the user himself/herself, thereby significantly improving sign-in efficiency and providing reliable technical guarantee for sign-in scenarios including a large number of people (such as a large conference).

Figure 3:
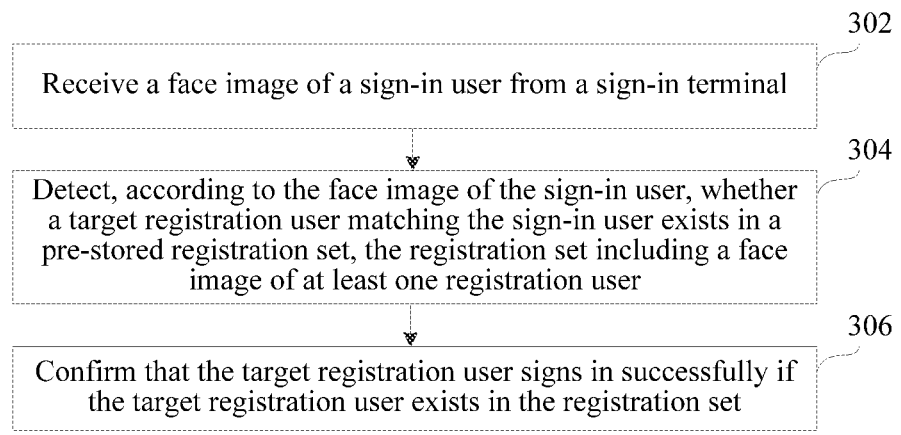
FIG. 3 is a flowchart of a sign-in method based on facial recognition according to an embodiment of the present disclosure.

Refer to FIG. 3, which is a flowchart of a sign-in method based on facial recognition according to an embodiment of the present disclosure. The method is applicable to a server. The method may include the following steps:

Step 302: Receive a face image of a sign-in user from a sign-in terminal.

Step 304: Detect, according to the face image of the sign-in user, whether a target registration user matching the sign-in user exists in a pre-stored registration set, the registration set including a face image of at least one registration user.

Step 306: Confirm that the target registration user signs in successfully if the target registration user exists in the registration set In conclusion, according to the method provided in this embodiment, a server receives a face image of a sign-in user from a sign-in terminal; detects, according to the face image of the sign-in user, whether a target registration user matching the sign-in user exists in a pre-stored registration set; and confirms that the target registration user signs in successfully if the target registration user exists in the registration set. The method resolves the problem in the electronic sign-in method in the existing technology that another person may sign in fraudulently, because with only a recognizable object, it is impossible to confirm the identity of a person who actually signs in. In this embodiment, facial scan sign-in is carried out based on facial recognition, so that the identity of a user who actually signs in is confirmed and verified, to avoid fraudulent sign-in by another person.

Figure 4:
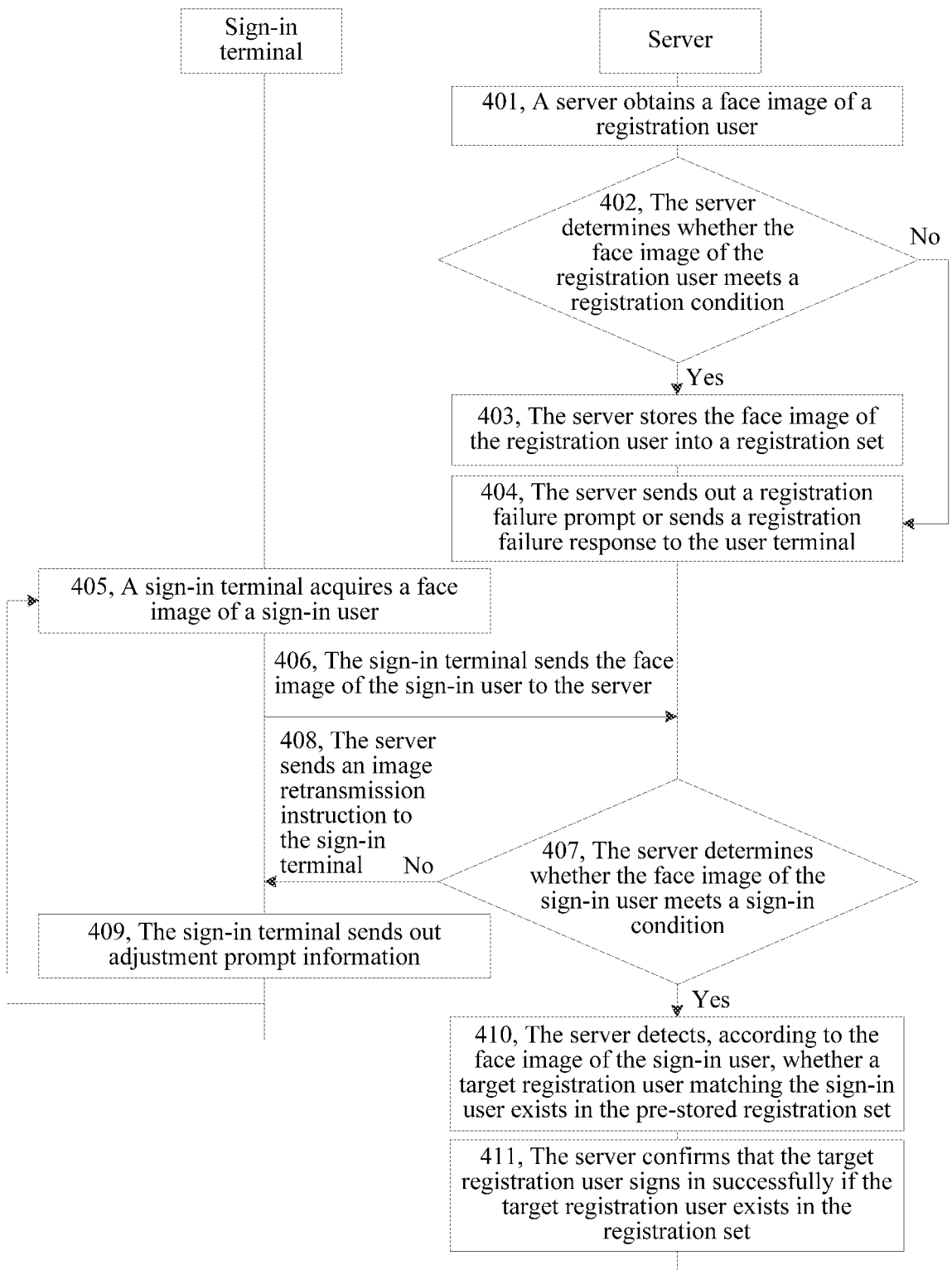
FIG. 4 is a flowchart of a sign-in method based on facial recognition according to another embodiment of the present disclosure.

Refer to FIG. 4, which is a flowchart of a sign-in method based on facial recognition according to another embodiment of the present disclosure. The method may include the following steps.

Step 401: A server obtains a face image of a registration user.

The registration user refers to a pre-registered user that needs to sign in. The server can obtain the face image of the registration user in the following two manners.

In the first possible implementation, the server displays a registration user entry interface, to obtain the face image of the registration user entered to the registration user entry interface. Using conference sign-in as an example, an administrator may create a conference in the server, and set conference information such as name, time, and address of the conference. After the conference is created, the administrator may enter face images of registration users (namely, conference participants) in the registration user entry interface provided by the server. In one embodiment, the administrator may enter identifications of participants (e.g., user ID, participant name, etc.) corresponding to the current conference, and the server may search previous conference registration data based on the identifications to obtain face images of the participants if such data is available. In another embodiment, the server may provide the administrator with a data import option, and when selected, information about previous conference(s) hosted by the administrator may be imported and edited to create information about the current conference, including entering face images of certain participants. In another embodiment, the server may provide a batch data processing option, and when selected, the server may automatically process a batch of multiple images uploaded/entered by the administrator to be added to the registration set, each image corresponding to a participant and has a file name indicating an identification of the participant. In addition, in an actual application, considering that the administrator may be unable to obtain face images of all or some registration users in advance, this embodiment further provides the following second possible implementation.

In the second possible implementation, the server receives the face image of the registration user from the user terminal. The administrator may send registration prompt information carrying a registration link to the user terminal corresponding to the registration user in advance. The registration prompt information is used for guiding the user to log on to a registration page corresponding to the registration link, and submit the face image to the registration page, to complete registration. Correspondingly, the user terminal obtains the registration link corresponding to the registration page, opens the registration page according to the registration link, obtains the face image of the registration user submitted to the registration page, and sends the face image of the registration user to the server. For example, the administrator may send an SMS message to the user terminal corresponding to the registration user by means of the server, where the SMS message includes the registration link. After opening the registration link, the registration user may be verified based on a phone number and log on to the registration page. Then, the registration user can shoot a face image or select a face image from an album and submit the face image to the registration page. In other words, the server allows two ways to store face image of registration users in the registration set, one being entered by the administrator, one being entered by accessing the registration link. It can be understood that the registration set may correspond to a specific conference created by the administrator, and the server may host multiple conference registration and sign-in verification tasks by identifying the specific registration set corresponding to the conference. The registration link may include an identification of the conference used to locate the registration set corresponding to the conference. The sign-in terminal may also send an identification of the current conference before or simultaneously as sending the face image of the sign-in user, such that the server can use the conference identification to locate the corresponding registration set.

Step 402: The server determines whether the face image of the registration user meets a registration condition.

The registration condition includes that a light condition of the face image of the registration user meets a first predetermined condition and/or a face pose of the face image of the registration user meets a second predetermined condition.

When the registration condition includes that a light condition of the face image of the registration user meets a first predetermined condition, this step includes the following sub-steps:

1. Extract a face region from the face image of the registration user.
2. Calculate a light score corresponding to the face region.
3. Determine whether the light score is greater than a predetermined score.
4. Determine that the light condition of the face image of the registration user meets the first predetermined condition if the light score is greater than the preset score.
5. Determine that the light condition of the face image of the registration user does not meet the first predetermined condition if the light score is less than the preset score.

The light score includes at least one of the following calculation parameters: 1. a difference S1 between a histogram of the left half of the face region and a histogram of the right half of the face region; 2. a difference S2 between an average luminance of the left half of the face region and an average luminance of the right half of the face region; 3. a difference S3 between an average luminance of the whole face region and a standard luminance value, the standard luminance value being an empirical value set in advance according to an actual requirement, for example, 0.55; and 4. a variance S4 of different partitions in the face region. When calculating the light score corresponding to the face region, the server 240 normalizes the calculation parameters into a range of [0, 1], and calculates the light score by using a weighted summation formula. For example, if the foregoing four calculation parameters are all included, the light score corresponding to the face region is calculated as follows: $s=w1\times s1+w2\times s2+w3\times s3+w4\times s4$, where s1, s2, s3, and s4 represent normalized results of S1, S2, S3, and S4 respectively. Values of the weights may be set in advance according to an actual requirement, for example, {w1, w2, w3, w4}={0.15, 0.1, 0.3, 0.45}.

When the registration condition includes that a face pose of the face image of the registration user meets a second predetermined condition, this step includes the following sub-steps:

1. Extract a face region from the face image of the registration user.
2. Calculate an inclination angle of the face region.
3. Determine whether the inclination angle of the face region belongs to a predetermined value range.
4. Determine that the face pose of the face image of the registration user meets the second predetermined condition if the inclination angle belongs to the predetermined value range.
5. Determine that the face pose of the face image of the registration user does not meet the second predetermined condition if the inclination angle does not belong to the predetermined value range.

The inclination angle of the face region may be calculated by using a related existing algorithm, which is not limited in this embodiment.

Step 403: The server stores the face image of the registration user into a registration set if the face image of the registration user meets the registration condition.

The registration set is used for storing face images of registration users. The server correspondingly stores an identifier and the face image of each registration user into the registration set. Optionally, the server extracts an image feature from the face image of the registration user by using a facial recognition algorithm, and correspondingly stores the identifier of each registration user and the image feature of the face image into the registration set correspondingly. For a specific algorithm process of the facial recognition algorithm, refer to the introduction and illustration below.

Step 404: The server sends out a registration failure prompt or sends a registration failure response to the user terminal if the face image of the registration user does not meet the registration condition.

Corresponding to the foregoing first possible implementation in step 401, the server sends out a registration failure prompt when determining that the face image of the registration user does not meet the registration condition. The registration failure prompt is used for reminding the administrator that the previously entered face image of the registration user is invalid. The administrator selects a new face image of the registration user according to the registration failure prompt. The new face image is entered to the registration user entry interface, so as to be submitted to the server.

Corresponding to the foregoing second possible implementation in step 402, the server sends a registration failure response to the user terminal when determining that the face image of the registration user does not meet the registration condition. Correspondingly, the user terminal further sends out prompt information after receiving the registration failure response, the prompt information being used for indicating that the face image of the registration user is invalid. The registration user shoots or selects a new face image according to the prompt information, and submits the new face image to the registration page.

Step 405: A sign-in terminal acquires a face image of a sign-in user.

The sign-in terminal is configured with a camera. The face image of the sign-in user is collected by the camera. During sign-in on site, the sign-in user faces the camera of the sign-in terminal, so that sign-in terminal acquires the face image of the user. The sign-in user refers to a user who actually signs in on a sign-in site.

Step 406: The sign-in terminal sends the face image of the sign-in user to the server.

Correspondingly, the server receives the face image of the sign-in user from the sign-in terminal.

Step 407: The server determines whether the face image of the sign-in user meets a sign-in condition.

The sign-in condition includes that a light condition of the face image of the sign-in user meets a first predetermined condition and/or a face pose of the face image of the sign-in user meets a second predetermined condition. A specific manner of determining whether the sign-in condition is met is the same as or similar to the manner of determining whether the registration condition is met. For details, refer to the introduction and illustration above. Details are not described herein again.

Step 408: The server sends an image retransmission instruction to the sign-in terminal if the face image of the sign-in user does not meet the sign-in condition.

Correspondingly, the sign-in terminal receives the image retransmission instruction from the server.

Step 409: The sign-in terminal sends out adjustment prompt information according to the image retransmission instruction, and performs step 405 and step 406 again.

The adjustment prompt information is used for prompting the user to adjust the light condition and/or face pose.

Step 410: The server detects, according to the face image of the sign-in user, whether a target registration user matching the sign-in user exists in the pre-stored registration set if the face image of the sign-in user meets the sign-in condition. Specifically, step 410 includes the following sub-steps:

1. Extract an image feature from the face image of the sign-in user by using a facial recognition algorithm having a recognition accuracy degree greater than a first threshold.

2. Separately calculate a similarity degree between the face image of the sign-in user and the face image of each registration user according to the image feature of the face image of the sign-in user and an image feature of the face image of each registration user;

3. Detect whether a maximum similarity degree is greater than a second threshold.

4. Confirm that a registration user corresponding to the maximum similarity degree is the target registration user matching the sign-in user, if the maximum similarity degree is greater than the second threshold.

In addition, it is confirmed that the sign-in user fails in sign-in if the maximum similarity degree is less than the second threshold. In this embodiment of the present disclosure, a facial recognition algorithm with a high recognition accuracy degree is used to extract the image feature of the face image, to ensure accurate matching between the sign-in user and the registration user, so that it can be directly confirmed that the target registration user signs in successfully when the target registration user matching the sign-in user exists in the registration set. The user does not need to further confirm manually whether the target registration user obtained through matching is the user himself/herself, thus reducing user operations, simplifying a sign-in process, and improving sign-in efficiency.

Optionally, the foregoing first sub-step includes: performing feature point positioning on the face image of the sign-in user, to obtain a feature point positioning result; dividing the face image of the sign-in user into multiple face regions according to the feature point positioning result; extracting a feature from each face region by using a deep network corresponding to the face region; and recombining the features extracted from the face regions, to obtain the image feature of the face image of the sign-in user. Feature points in the face image refer to center of the eyes, tip of the nose, corners of the mouth, and so on in the face. The feature point positioning result may be represented by using a feature point vector that includes coordinates of each feature point. For different face regions, corresponding deep networks are separately trained in advance. The deep networks are used for extracting image features from the face regions, and CNNs may be used as the deep networks. In this embodiment of the present disclosure, the image feature of the face image is obtained by using a deep learning-based facial recognition algorithm, achieving a higher recognition accuracy degree compared with other facial recognition algorithms. In addition, respective deep networks corresponding to different face regions (such as an eye region, a nose region, and a mouth region) are trained separately, and features are extracted by using the respective deep networks, to fully ensure the accuracy of feature extraction.

Step 411: The server confirms that the target registration user signs in successfully if the target registration user exists in the registration set.

Optionally, after confirming that the target registration user signs in successfully, the server may further mark the target registration user as signed in. Further, the server may further collect statistics about registration users marked as signed in and/or registration users that have not signed in, and present the statistical result. For example, the server may present the statistical result such as all registration users that have signed in, all registration users that have not signed in, and the quantity or ratio of the registration users that have signed in.

In conclusion, according to the method provided in this embodiment, a server receives a face image of a sign-in user from a sign-in terminal; detects, according to the face image of the sign-in user, whether a target registration user matching the sign-in user exists in a pre-stored registration set; and confirms that the target registration user signs in successfully if the target registration user exists in the registration set. The method resolves the problem in the electronic sign-in method in the existing technology that another person may sign in fraudulently, because with only a recognizable object, it is impossible to confirm the identity of a person who actually signs in. In this embodiment, facial scan sign-in is carried out based on facial recognition, so that the identity of a user who actually signs in is confirmed and verified, to avoid fraudulent sign-in by another person.

In addition, according to the method provided in this embodiment, an image feature of the face image is further extracted by using a facial recognition algorithm having a high recognition accuracy degree, to ensure accurate matching between the sign-in user and the registration user, so that it can be directly confirmed that the target registration user signs in successfully when the target registration user matching the sign-in user exists in the registration set. The user does not need to further confirm manually whether the target registration user obtained through matching is the user himself/herself, thus reducing user operations, simplifying a sign-in process, and improving sign-in efficiency.

In addition, according to the method provided in this embodiment, it is further determined whether the face image of the registration user meets a registration condition and/or whether the face image of the sign-in user meets a sign-in condition, to ensure that an image with a good light condition and a neutral face pose is obtained, avoiding impact of factors such as lighting and pose on the facial recognition result and improving accuracy of facial recognition and matching. For example, the technical solution provided in this embodiment of the present disclosure can obtain a face image under an indoor light condition, the face pose in the face image being allowed to turn left and right or up and down within 30 degrees, to ensure a good facial recognition and matching result.

In addition, according to the method provided in this embodiment, the server further provides a remote registration page to the user terminal, so that the registration user registers and submits the face image thereof, avoiding the problem that the registration fails because an administrator cannot acquire the face image of the registration user in advance.

The apparatus embodiment of the present disclosure described in the following can be configured to execute the method embodiment of the present disclosure. For details not disclosed in the apparatus embodiment of the present disclosure, refer to the method embodiment of the present disclosure.

Figure 5:
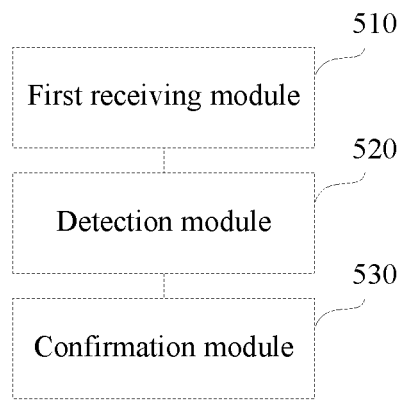
FIG. 5 is a block diagram of a sign-in apparatus based on facial recognition according to another embodiment of the present disclosure.

Refer to FIG. 5, which is a block diagram of a sign-in apparatus based on facial recognition according to an embodiment of the present disclosure. The sign-in apparatus has functions for implementing a server side in the foregoing method embodiment. The functions may be implemented by hardware, or by hardware executing corresponding software. The sign-in apparatus includes: a first receiving module 510, a detection module 520, and a confirmation module 530.

The first receiving module 510 is configured to receive a face image of a sign-in user from a sign-in terminal.

The detection module 520 is configured to detect, according to the face image of the sign-in user received by the first receiving module 510, whether a target registration user matching the sign-in user exists in a pre-stored registration set, the registration set including a face image of at least one registration user.

The confirmation module 530 is configured to confirm that the target registration user signs in successfully when the detection module 520 detects that the target registration user exists in the registration set.

In conclusion, according to the apparatus provided in this embodiment, a server receives a face image of a sign-in user from a sign-in terminal; detects, according to the face image of the sign-in user, whether a target registration user matching the sign-in user exists in a pre-stored registration set; and confirms that the target registration user signs in successfully if the target registration user exists in the registration set. The apparatus resolves the problem in the electronic sign-in method in the existing technology that another person may sign in fraudulently, because with only a recognizable object, it is impossible to confirm the identity of a person who actually signs in. In this embodiment, facial scan sign-in is carried out based on facial recognition, so that the identity of a user who actually signs in is confirmed and verified, to avoid fraudulent sign-in by another person.

Figure 6:
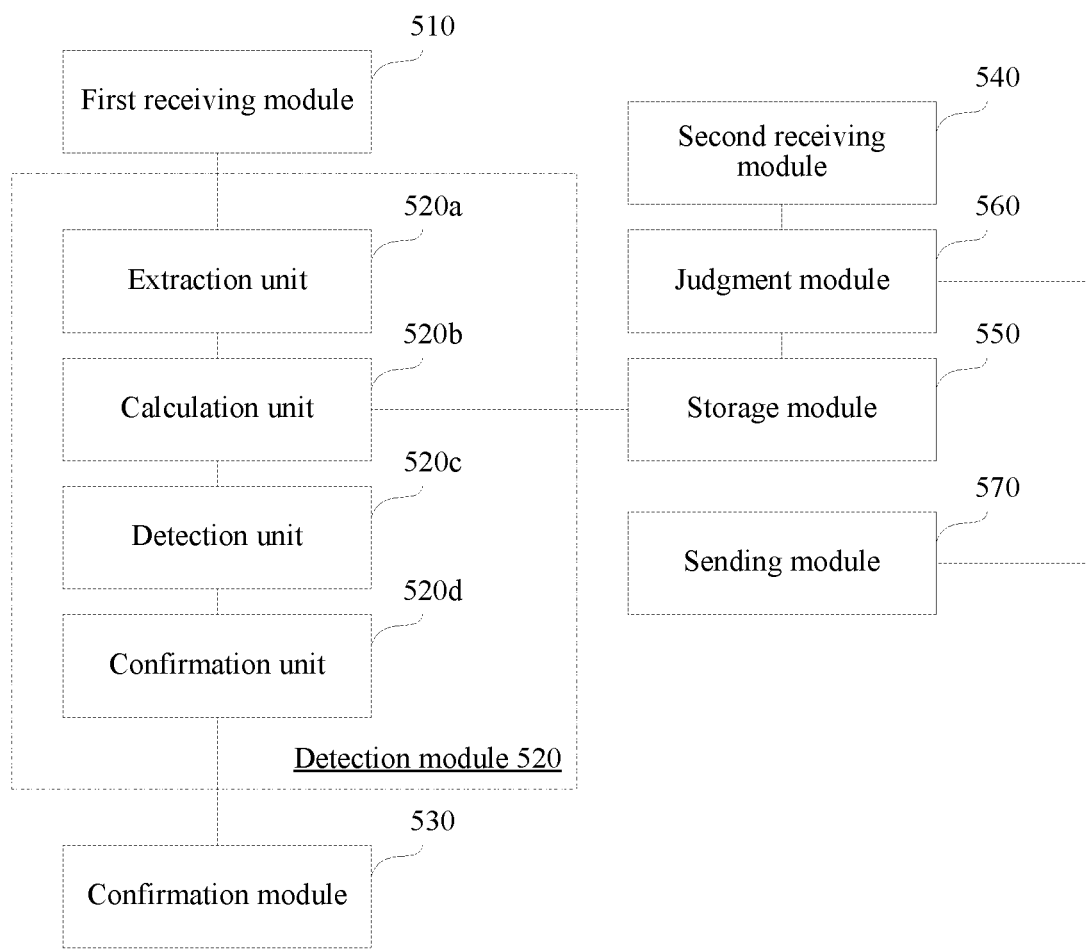
FIG. 6 is a block diagram of a sign-in apparatus based on facial recognition according to another embodiment of the present disclosure.

Refer to FIG. 6, which is a block diagram of a sign-in apparatus based on facial recognition according to another embodiment of the present disclosure. The sign-in apparatus has functions for implementing a server side in the foregoing method embodiment. The functions may be implemented by hardware, or by hardware executing corresponding software. The sign-in apparatus includes: a first receiving module 510, a detection module 520, and a confirmation module 530.

The first receiving module 510 is configured to receive a face image of a sign-in user from a sign-in terminal.

The detection module 520 is configured to detect, according to the face image of the sign-in user received by the first receiving module 510, whether a target registration user matching the sign-in user exists in a pre-stored registration set, the registration set including a face image of at least one registration user.

The confirmation module 530 is configured to confirm that the target registration user signs in successfully when the detection module 520 detects that the target registration user exists in the registration set.

Optionally, the detection module 520 includes: an extraction unit 520a, a calculation unit 520b, a detection unit 520c and a confirmation unit 520d.

The extraction unit 520a is configured to extract, by using a facial recognition algorithm having a recognition accuracy degree greater than a first threshold, an image feature from the face image of the sign-in user received by the first receiving module 510.

The calculation unit 520b is configured to separately calculate a similarity degree between the face image of the sign-in user and the face image of each registration user according to the image feature of the face image of the sign-in user extracted by the extraction unit 520a and an image feature of the face image of each registration user.

The detection unit 520c is configured to detect whether a maximum similarity degree is greater than a second threshold according to the calculation result of the calculation unit 520b.

The confirmation unit 520d is configured to confirm that a registration user corresponding to the maximum similarity degree is the target registration user matching the sign-in user, when the detection unit 520c detects that the maximum similarity degree is greater than the second threshold.

Optionally, the extraction unit 520a is specifically configured to: perform feature point positioning on the face image of the sign-in user received by the receiving module 510, to obtain a feature point positioning result; divide the face image of the sign-in user into multiple face regions according to the feature point positioning result; extract a feature from each face region by using a deep network corresponding to the face region; and recombine the features extracted from the face regions, to obtain the image feature of the face image of the sign-in user.

Optionally, the apparatus provided in this embodiment further includes: a second receiving module 540 and a storage module 550.

The second receiving module 540 is configured to receive the face image of the registration user from a user terminal, the face image of the registration user being submitted by the registration user to a registration page displayed on the user terminal.

The storage module 550 is configured to store the face image of the registration user received by the second receiving module 540 into the registration set.

Optionally, the apparatus provided in this embodiment further includes: a judgment module 560 and a sending module 570.

The judgment module 560 is configured to determine whether the face image of the registration user received by the second receiving module 540 meets a registration condition, where the registration condition includes that a light condition of the face image of the registration user meets a first predetermined condition and/or a face pose of the face image of the registration user meets a second predetermined condition The storage module 550 is further configured to store the face image of the registration user received by the second receiving module 540 into the registration set when the judgment module 560 determines that the face image of the registration user meets the registration condition.

The sending module 570 is configured to send a registration failure response to the user terminal when the judgment module 560 determines that the face image of the registration user does not meet the registration condition. The registration failure response is used for triggering the user terminal to send out prompt information indicating that the face image of the registration user is invalid In conclusion, according to the apparatus provided in this embodiment, a server receives a face image of a sign-in user from a sign-in terminal; detects, according to the face image of the sign-in user, whether a target registration user matching the sign-in user exists in a pre-stored registration set; and confirms that the target registration user signs in successfully if the target registration user exists in the registration set. The apparatus resolves the problem in the electronic sign-in method in the existing technology that another person may sign in fraudulently, because with only a recognizable object, it is impossible to confirm the identity of a person who actually signs in. In this embodiment, facial scan sign-in is carried out based on facial recognition, so that the identity of a user who actually signs in is confirmed and verified, to avoid fraudulent sign-in by another person.

In addition, according to the apparatus provided in this embodiment, an image feature of the face image is further extracted by using a facial recognition algorithm having a high recognition accuracy degree, to ensure accurate matching between the sign-in user and the registration user, so that it can be directly confirmed that the target registration user signs in successfully when the target registration user matching the sign-in user exists in the registration set. The user does not need to further confirm manually whether the target registration user obtained through matching is the user himself/herself, thus reducing user operations, simplifying a sign-in process, and improving sign-in efficiency.

In addition, according to the apparatus provided in this embodiment, it is further determined whether the face image of the registration user meets a registration condition and/or whether the face image of the sign-in user meets a sign-in condition, to ensure that an image with a good light condition and a neutral face pose is obtained, avoiding impact of factors such as lighting and pose on the facial recognition result and improving accuracy of facial recognition and matching. For example, the technical solution provided in this embodiment of the present disclosure can obtain a face image under an indoor light condition, the face pose in the face image being allowed to turn left and right or up and down within 30 degrees, to ensure a good facial recognition and matching result.

In addition, according to the apparatus provided in this embodiment, the server further provides a remote registration page to the user terminal, so that the registration user registers and submits the face image thereof, avoiding the problem that the registration fails because an administrator cannot acquire the face image of the registration user in advance.

It should be noted that, when the apparatus provided in the foregoing embodiment implements the functions thereof, division of the foregoing functional modules is only described for exemplary purposes. In an actual application, the foregoing functions may be allocated to be accomplished by different functional modules according to requirements, that is, the internal structure of the device is divided into different functional modules, to accomplish all or some of the foregoing functions. In addition, the apparatus provided in the foregoing embodiment belongs to the same concept as the method embodiment. For a specific implementation process of the apparatus, refer to the method embodiment, and details are not described herein again.

Figure 7:
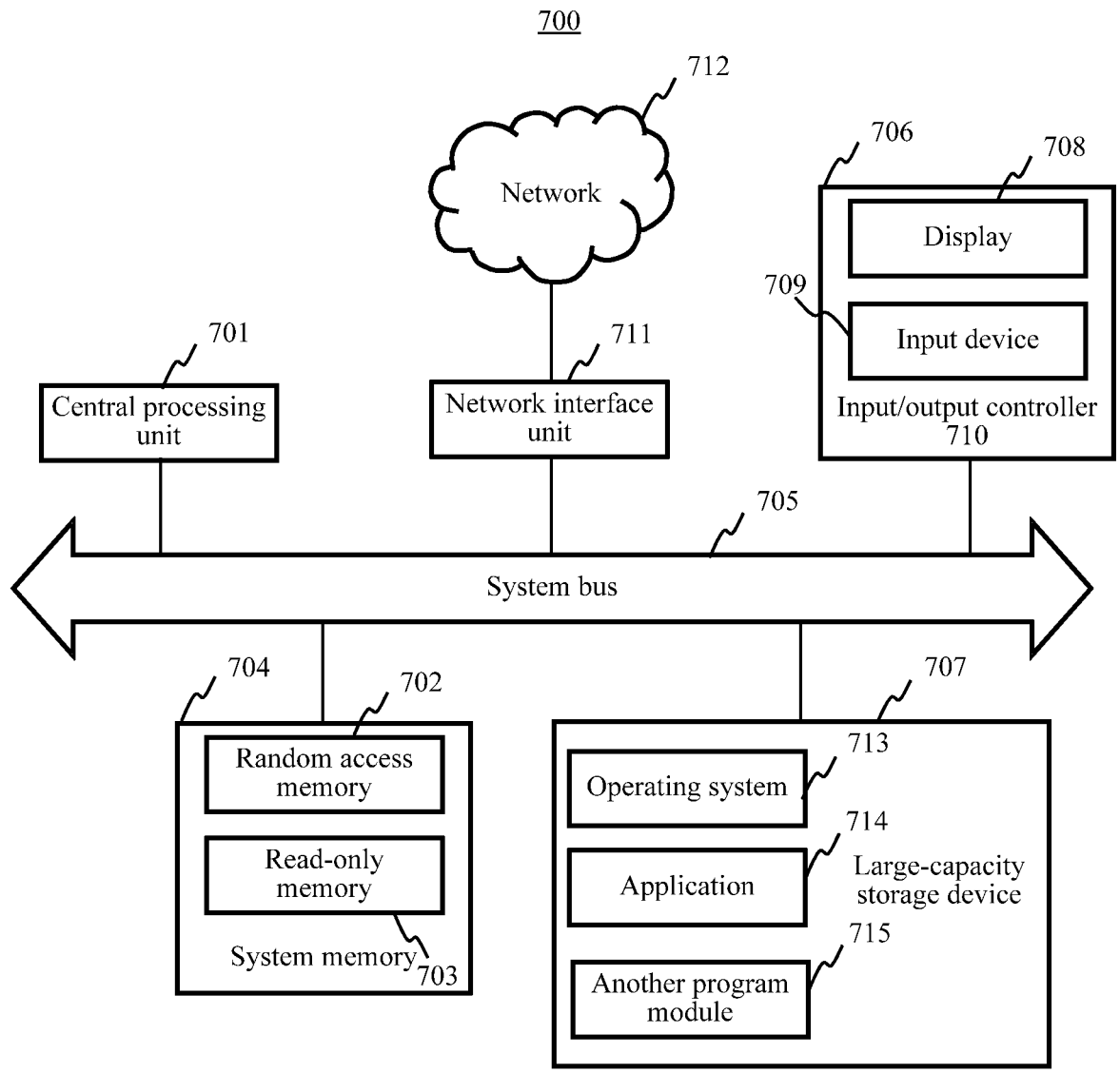
FIG. 7 is a schematic structural diagram of a server according to an embodiment of the present disclosure.

Refer to FIG. 7, which is a schematic structural diagram of a server according to an embodiment of the present disclosure. The server is configured to implement the server-side sign-in method provided in the foregoing embodiment. Specifically:

The server 700 includes a central processing unit (CPU) 701, a system memory 704 including a random-access memory (RAM) 702 and a read-only memory (ROM) 703, and a system bus 705 connecting the system memory 704 and the CPU 701. The server 700 further includes a basic input/output system (I/O system) 706 assisting in transmitting information between devices in a computer, and a large-capacity storage device 707 configured to store an operating system 713, an application program 714 and another program module 715.

The basic I/O system 706 includes a display 708 configured to display information and an input device 709, such as a mouse or a keyboard, configured to input information for a user. The display 708 and the input device 709 are both connected to the CPU 701 by using an input and output controller 710 connected to the system bus 705. The basic I/O system 706 may further include the input and output controller 710 to receive and process inputs from multiple other devices such as a keyboard, a mouse, and an electronic stylus. Similarly, the input and output controller 710 further provides an output to a display screen, a printer or another type of output device.

The large-capacity storage device 707 is connected to the CPU 701 by using a large-capacity storage controller (not shown) connected to the system bus 705. The large-capacity storage device 707 and its associated computer readable medium provide non-volatile storage for the server 700. That is to say, the large-capacity storage device 707 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an erasable programmable read-only memory (EPROM), an electrically erasable programmable read-only memory (EEPROM), a flash memory or other solid-state storage technologies; a CD-ROM, a DVD or other optical storages; and a cassette, a magnetic tape, a disk storage or other magnetic storage devices. Certainly, a person skilled in art can know that the computer storage medium is not limited to the foregoing several types. The system memory 704 and the large-capacity storage device 707 may be collectively referred to as a memory.

According to the embodiments of the present disclosure, the server 700 may further be connected, by using a network such as the Internet, to a remote computer on the network and run. That is, the server 700 may be connected to a network 712 by using a network interface unit 711 connected to the system bus 705, or may be connected to another type of network or remote computer system (not shown) by using the network interface unit 711.

The memory 704 further includes one or more programs. The one or more programs are stored in the memory 704 and configured to be executed by one or more processors. The one or more programs include instructions for performing the server-side sign-in method in the foregoing embodiment.

The technical solutions provided by the embodiments of the present disclosure bring about the following beneficial effects: a server receives a face image of a sign-in user from a sign-in terminal, detects, according to the face image of the sign-in user, whether a target registration user matching the sign-in user exists in a pre-stored registration set, and confirms that the target registration user signs in successfully if the target registration user exists in the registration set. The present disclosure resolves the problem in the electronic sign-in method in the existing technology that another person may sign in fraudulently, because with only a recognizable object, it is impossible to confirm the identity of a person who actually signs in. In the present disclosure, facial scan sign-in is carried out based on facial recognition, so that the identity of a user who actually signs in is confirmed and verified, to avoid fraudulent sign-in by another person.

In an exemplary embodiment, a non-transitory computer readable storage medium including an instruction is further provided, for example, a memory including an instruction. The instruction may be executed by the processor of the server to accomplish the server-side steps in the foregoing method embodiment. For example, the non-temporary computer readable storage medium may be a ROM, a RAM, a CD-ROM, a magnetic tape, a floppy disk, and an optical data storage device.

It should be understood that, the term "multiple" mentioned in the text refers to two or more. The term "and/or" describes an association relationship between associated objects, and indicate there may be three types of relationships. For example, "A and/or B" may represent: A exists alone, both A and B exist, and B exists alone. The character "/" generally represents an "or" relationship between associated objects before and after "/".

The sequence numbers of the preceding embodiments of the present disclosure are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A sign-in method based on facial recognition, comprising:
   creating a current conference event carrying conference information based on input of an administrative user;
   creating a registration set corresponding to the current conference event, the registration set comprising a face image of at least one registration user, each registration user having a corresponding identification, comprising:
     entering, based on the input of the administrative user, a face image of a first participant of the current conference event to the registration set as the face image of a first registration user;
     adding a face image of a second registration user to the registration set by searching previous conference registration data based on an identification of a second participant of the current conference event input by the administrator user; and
     receiving a face image of a third registration user from a user terminal and storing the face image of the third registration user to the registration set;
   receiving a face image of a sign-in user from a sign-in terminal at a conference corresponding to the current conference event;
   detecting, according to the face image of the sign-in user, whether a target registration user matching the sign-in user exists in the registration set; and
   confirming that the target registration user signs in successfully if the target registration user exists in the registration set.

2. The method according to claim 1, wherein the detecting, according to the face image of the sign-in user, whether a target registration user matching the sign-in user exists in a pre-stored registration set comprises:
   extracting an image feature from the face image of the sign-in user by using a facial recognition algorithm having a recognition accuracy degree greater than a first threshold;
   separately calculating a similarity degree between the face image of the sign-in user and the face image of each registration user according to the image feature of the face image of the sign-in user and an image feature of the face image of each registration user;

detecting whether a maximum similarity degree is greater than a second threshold; and confirming that a registration user corresponding to the maximum similarity degree is the target registration user matching the sign-in user, if the maximum similarity degree is greater than the second threshold.

3. The method according to claim 2, wherein the extracting an image feature from the face image of the sign-in user by using a facial recognition algorithm having a recognition accuracy degree greater than a first threshold comprises:

performing feature point positioning on the face image of the sign-in user, to obtain a feature point positioning result;

dividing the face image of the sign-in user into multiple face regions according to the feature point positioning result;

extracting a feature from each face region by using a deep network corresponding to the face region to obtain multiple features corresponding to the multiple face regions; and recombining the multiple features extracted from the face regions, to obtain the image feature of the face image of the sign-in user.

4. The method according to claim 1, wherein the face image of the third registration user is submitted by the third registration user to a registration page displayed on the user terminal.

5. The method according to claim 4, before the storing the face image of the third registration user into the registration set, further comprising:

determining whether the face image of the third registration user meets a registration condition, wherein the registration condition comprises at least one of: a light condition of the face image of the third registration user meeting a first predetermined condition or a face pose of the face image of the third registration user meeting a second predetermined condition;

storing the face image of the third registration user into the registration set if the face image of the third registration user meets the registration condition; and sending a registration failure response to the user terminal if the face image of the third registration user does not meet the registration condition, the registration failure response being used for triggering the user terminal to present prompt information indicating that the face image of the third registration user is invalid.

6. The method according to claim 4, further comprising: sending registration prompt information carrying a registration link to the user terminal corresponding to the third registration user, the registration prompt information guiding a user to log on to the registration page corresponding to the registration link.

7. The method according to claim 1, further comprising: providing a data import option to the administrative user for creating the current conference event; and upon detecting that the data import option is selected, editing the previous conference registration data to generate the current conference even and to establish at least part of the registration set corresponding to the current conference event.

8. The method according to claim 1, wherein creating the registration set comprises:

providing a batch data processing option for creating the registration set; and upon detecting that the batch data processing option, automatically adding a batch of multiple face images entered by the administrative user to the registration set, each image corresponding to a participant and has a file name indicating an identification of the participant.

9. A server, comprising:
one or more processors; and
a memory, wherein
the one or more processors are configured to perform:
creating a current conference event carrying conference information based on input of an administrative user;
creating a registration set corresponding to the current conference event, the registration set comprising a face image of at least one registration user, each registration user having a corresponding identification, comprising:
  entering, based on the input of the administrative user, a face image of a first participant of the current conference event to the registration set as the face image of a first registration user;
  adding a face image of a second registration user to the registration set by searching previous conference registration data based on an identification of a second participant of the current conference event input by the administrator user; and
  receiving a face image of a third registration user from a user terminal and storing the face image of the third registration user to the registration set;
receiving a face image of a sign-in user from a sign-in terminal at a conference corresponding to the current conference event;
detecting, according to the face image of the sign-in user, whether a target registration user matching the sign-in user exists in the registration set; and
confirming that the target registration user signs in successfully if the target registration user exists in the registration set.

10. The server according to claim 9, wherein the one or more processors are further configured to perform:

extracting an image feature from the face image of the sign-in user by using a facial recognition algorithm having a recognition accuracy degree greater than a first threshold;

separately calculating a similarity degree between the face image of the sign-in user and the face image of each registration user according to the image feature of the face image of the sign-in user and an image feature of the face image of each registration user;

detecting whether a maximum similarity degree is greater than a second threshold; and confirming that a registration user corresponding to the maximum similarity degree is the target registration user matching the sign-in user, if the maximum similarity degree is greater than the second threshold.

11. The server according to claim 10, wherein the one or more programs processors are further configured to perform:

performing feature point positioning on the face image of the sign-in user, to obtain a feature point positioning result;

dividing the face image of the sign-in user into multiple face regions according to the feature point positioning result;

extracting a feature from each face region by using a deep network corresponding to the face region to obtain multiple features corresponding to the multiple face regions; and recombining the multiple features extracted from the face regions, to obtain the image feature of the face image of the sign-in user.

12. The server according to claim 9, wherein:
the face image of the third registration user is submitted by the third registration user to a registration page displayed on the user terminal.

13. The server according to claim 12, wherein the one or more processors are further configured to perform:
determining whether the face image of the third registration user meets a registration condition, wherein the registration condition comprises at least one of: a light condition of the face image of the third registration user meeting a first predetermined condition or a face pose of the face image of the third registration user meeting a second predetermined condition;
storing the face image of the third registration user into the registration set if the face image of the third registration user meets the registration condition; and
sending a registration failure response to the user terminal if the face image of the third registration user does not meet the registration condition, the registration failure response being used for triggering the user terminal to present prompt information indicating that the face image of the third registration user is invalid.

14. The server according to claim 12, wherein the one or more processors are further configured to perform:
sending registration prompt information carrying a registration link to the user terminal corresponding to the third registration user, the registration prompt information guiding a user to log on to the registration page corresponding to the registration link.

15. A non-transitory computer-readable storage medium storing computer program instructions executable by at least one processor to perform:
creating a current conference event carrying conference information based on input of an administrative user;
creating a registration set corresponding to the current conference event, the registration set comprising a face image of at least one registration user, each registration user having a corresponding identification, comprising:
entering, based on the input of the administrative user, a face image of a first participant of the current conference event to the registration set as the face image of a first registration user;
adding a face image of a second registration user to the registration set by searching previous conference registration data based on an identification of a second participant of the current conference event input by the administrator user; and
receiving a face image of a third registration user from a user terminal and storing the face image of the third registration user to the registration set;
receiving a face image of a sign-in user from a sign-in terminal at a conference corresponding to the current conference event;
detecting, according to the face image of the sign-in user, whether a target registration user matching the sign-in user exists in the registration set; and
confirming that the target registration user signs in successfully if the target registration user exists in the registration set.

16. The storage medium according to claim 15, wherein the computer program instructions further cause the at least one processor to perform:
extracting an image feature from the face image of the sign-in user by using a facial recognition algorithm having a recognition accuracy degree greater than a first threshold;
separately calculating a similarity degree between the face image of the sign-in user and the face image of each registration user according to the image feature of the face image of the sign-in user and an image feature of the face image of each registration user;
detecting whether a maximum similarity degree is greater than a second threshold; and
confirming that a registration user corresponding to the maximum similarity degree is the target registration user matching the sign-in user, if the maximum similarity degree is greater than the second threshold.

17. The storage medium according to claim 16, wherein the computer program instructions further cause the at least one processor to perform:
performing feature point positioning on the face image of the sign-in user, to obtain a feature point positioning result;
dividing the face image of the sign-in user into multiple face regions according to the feature point positioning result;
extracting a feature from each face region by using a deep network corresponding to the face region to obtain multiple features corresponding to the multiple face regions; and
recombining the multiple features extracted from the face regions, to obtain the image feature of the face image of the sign-in user.

18. The storage medium according to claim 15, wherein:
the face image of the third registration user is submitted by the third registration user to a registration page displayed on the user terminal.

19. The storage medium according to claim 18, wherein the computer program instructions further cause the at least one processor to perform:
determining whether the face image of the third registration user meets a registration condition, wherein the registration condition comprises at least one of: a light condition of the face image of the third registration user meeting a first predetermined condition or a face pose of the face image of the third registration user meeting a second predetermined condition;
storing the face image of the third registration user into the registration set if the face image of the third registration user meets the registration condition; and
sending a registration failure response to the user terminal if the face image of the third registration user does not meet the registration condition, the registration failure response being used for triggering the user terminal to present prompt information indicating that the face image of the third registration user is invalid.

20. The storage medium according to claim 18, wherein the computer program instructions further cause the at least one processor to perform:
sending registration prompt information carrying a registration link to the user terminal corresponding to the third registration user, the registration prompt information guiding a user to log on to the registration page corresponding to the registration link.

* * * * *